United States Patent
Wickenkamp et al.

(10) Patent No.: US 9,782,681 B2
(45) Date of Patent: Oct. 10, 2017

(54) METHODS AND SYSTEMS FOR CONTROLLING MEDIA GUIDANCE APPLICATION OPERATIONS DURING VIDEO GAMING APPLICATIONS

(71) Applicant: United Video Properties, Inc., Santa Clara, CA (US)

(72) Inventors: Vanessa Wickenkamp, Elmhurst, IL (US); Andrew Fundament, Arlington Heights, IL (US); Andy Dustin, Palos Hills, IL (US); William J. Korbecki, Crystal Lake, IL (US); Douglas J. Seyller, Lisle, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 600 days.

(21) Appl. No.: 14/265,705

(22) Filed: Apr. 30, 2014

(65) Prior Publication Data

US 2015/0314201 A1    Nov. 5, 2015

(51) Int. Cl.
| | |
|---|---|
| *A63F 13/22* | (2014.01) |
| *H04N 21/00* | (2011.01) |
| *A63F 13/85* | (2014.01) |
| *A63F 13/49* | (2014.01) |
| *A63F 13/493* | (2014.01) |

(52) U.S. Cl.
CPC ........... *A63F 13/85* (2014.09); *A63F 13/22* (2014.09); *A63F 13/49* (2014.09); *A63F 13/493* (2014.09); *H04N 21/00* (2013.01)

(58) Field of Classification Search
None
See application file for complete search history.

(56) References Cited

U.S. PATENT DOCUMENTS

| | | | |
|---|---|---|---|
| 6,616,533 B1* | 9/2003 | Rashkovskiy | A63F 13/10 463/31 |
| 2006/0068861 A1* | 3/2006 | Triestram | A63F 13/10 463/1 |
| 2007/0162502 A1* | 7/2007 | Thomas | G06F 17/3082 |
| 2008/0059408 A1* | 3/2008 | Barsness | G06F 17/30545 |
| 2014/0179427 A1* | 6/2014 | Miura | A63F 13/00 463/31 |

* cited by examiner

*Primary Examiner* — Kang Hu
*Assistant Examiner* — Robert T Clarke, Jr.
(74) *Attorney, Agent, or Firm* — Haley Guiliano LLP

(57) ABSTRACT

Methods and systems are disclosed herein for a media guidance application that determines a control scheme for a video game and maps the performance of particular media guidance application operations, unrelated to the video game, to the particular user input type already mapped to a video game function such that when the user performs the video game function, the particular media guidance application operation is also performed.

18 Claims, 6 Drawing Sheets

METHODS AND SYSTEMS FOR CONTROLLING MEDIA GUIDANCE APPLICATION OPERATIONS DURING VIDEO GAMING APPLICATIONS

BACKGROUND

In conventional systems, users have access to a plurality of interactive media content. One type of interactive media content is a video gaming application. In a typical video gaming application, a user controls and manipulates his or her progress through the video game by user inputs entered into a user input interface. The user input types available to the user, and the function associated with each, is typically determined by the video game.

While the user input types available to the user are often sufficient in meeting the needs of the user in relation to the video gaming application, users may wish to access other content that is unrelated to the video gaming application. Moreover, during particular points in the video gaming, a user may find it advantageous if media guidance application operations unrelated to the video gaming application (e.g., recording content, accessing a listing of current available programs, etc.) may be accessed and controlled while a user enjoys the video gaming application. However, control schemes used to operate video gaming applications often do not account for the need to perform media guidance application operations unrelated to the video gaming applications; thus, typical control schemes do not have user input types available for use in controlling additional media guidance application operations.

SUMMARY

Accordingly, methods and systems are disclosed herein for a media guidance application that determines a control scheme for a video game and maps the performance of particular media guidance application operations, unrelated to the video game, to the particular user input type already mapped to a video game function such that when the user performs the video game function, the particular media guidance application operation is also performed. For example, one media guidance application operation may be the presentation of currently available media assets. Likewise, the control scheme of the video game may indicate that a particular user input type (e.g., a particular button on a control pad) is associated with pausing the video game. In this example, the media guidance application may map the performance of the media guidance application operation to the receipt of the particular user input type such that when a user triggers the user input type (e.g., presses the button) the video game is paused and currently available media assets are presented.

In some aspects, a media guidance application may determine a control scheme for operating a video game, in which the control scheme indicates a first-user input type for performing a first function in the video game. For example, the control scheme may indicate different video game functions (e.g., the performance of an action within the video game) that are mapped to different user input types (e.g., the various buttons on a game controller).

The media guidance application may cross-reference the first function with a database of functions that are suitable for linking to media guidance application operations to determine whether the first function is suitable for linking to at least one of the media guidance application operations. For example, of the various functions (e.g., selecting in-game objects, performing in-game jumps, accessing in-game menus, pausing the video game, etc.) only some of the functions may be suitable for linking to media guidance application operations. For example, while a "pause" command may be suitable for linking to a media guidance application operation (e.g., generating an overlay presenting a program currently being broadcast while the video game is paused), a "jump" command (e.g., causing an in-game character to jump within the game) may not be suitable for linking to a media guidance application operation. Accordingly, the media guidance application may cross-reference a database to determine which functions are suitable for linking to media guidance application operations.

The media guidance application may select a media guidance application operation to associate with the first user input type in response to determining that the first function is suitable for linking to at least one of the media guidance application operations. For example, in response to determining that a function of the video game (e.g., performing a pause command) is suitable for linking to at least one of the media guidance application operations, the media guidance application may select a media guidance application operation (e.g., the presentation of calendar reminders) to be linked to the user input type that is associated with the suitable function. For example, the media guidance application may cross-reference the first function with a database listing media guidance application operations that correspond to different functions to determine the media guidance application operation to associate with the first user input type.

The media guidance application may then perform the first function and the selected media guidance application operation in response to receiving the first user input type. For example, in response to a user activating the user input type, the media guidance application may pause the video game (e.g., the suitable function) and perform the selected media guidance application operation (e.g., recommend available media assets) automatically (i.e., without a user input requesting the media guidance application operation that is independent of the user input request for the performance of the video game function).

In some embodiments, the media guidance application may determine that the control scheme includes multiple user input types. For example, the control scheme may include a first user input type that is associated with a first function in the video game (e.g., activating an in-game menu) and a second user input type that is associated with a second function (e.g., selecting in-game objects) in the video game. Moreover, the media guidance application may not select a media guidance application operation to associate with the second user input type in response to determining that the second function is not suitable for linking to at least one of the media guidance application operations. Accordingly, the media guidance application may perform only the second function in response to receiving the second user input type.

In some embodiments, a function associated with a user input type may change based on the point in the video game. For example, a first user input type may be associated with a first function (e.g., causing an in-game player to move in a particular direction) at a first point in the video game (e.g., during a level of the video game) and a second function (e.g., navigating an in-game menu) at a second point (e.g., prior to beginning a level) in the video game. In such cases, the media guidance application may determine whether the current point in the video game corresponds to the first point or the second point.

In some embodiments, a function associated with a user input type may change based on one or more user input types that were received before. For example, a first user input type may initially be associated with a first function (e.g., causing an in-game player to move in a particular direction). However, the first user input type may be associated with a second function (e.g., navigating an in-game menu), if the user previously selected a second user input type (e.g., causing an in-game menu to be activated) before the first user input type. In such cases, the media guidance application may determine whether the second user input type was received before the first user input type.

In some embodiments, a media guidance application operation associated with a user input type may change based on whether or not a media guidance application operation has been performed. For example, a first user input type may initially cause a presentation of media listings to be generated for display. However, the first user input type may also be associated with removing the presentation of media listings, if the first user input is received while the presentation of media listings is generated for display. In such cases, the media guidance application may determine whether the second user input type was received before the first user input type.

In some embodiments, a media guidance application operation associated with a user input type may change based on the point in the video game. For example, a user input type may be associated with a first media guidance application operation (e.g., recording a screenshot or a series of screenshots of the video game gameplay) at a first point in the video game (e.g., during a level of the video game) and a second media guidance application operation (e.g., raising the volume on a display device) at a second point (e.g., prior to beginning a level) in the video game. In such cases, the media guidance application may determine whether the current point in the video game corresponds to the first point or the second point.

In some embodiments, a media guidance application operation associated with a user input type may change based on the current content of the video game. For example, a user input type associated with first content (e.g., selecting an in-game object associated with a first entity) may be associated with a first media guidance application operation (e.g., presenting an advertisement for the first entity), and the same user input type, but now associated with second content (e.g., selecting an in-game object associated with a second entity) may be associated with a second media guidance application operation (e.g., presenting an advertisement for the first entity).

In some embodiments, a control scheme associated with the video game or with a media guidance application may change based on whether or not a media guidance application operation has been performed. For example, a first user input type may initially cause a media guidance application operation (e.g., recording a segment of the video game) to be performed. However, after the media guidance application has been performed, the control scheme may be modified (e.g., to include fast-access playback operations for the recorded segment).

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
FIG. 1 shows an illustrative media guidance application in accordance with some embodiments of the disclosure.

Methods and systems are disclosed herein for a media guidance application that determines a control scheme for a video game and maps the performance of particular media guidance application operations, unrelated to the video game, to the particular user input type already mapped to a video game function such that when the user performs the video game function, the particular media guidance application operation is also performed. For example, the media guidance application may map the performance of a media guidance application operation (e.g., presenting currently available media assets) to the receipt of a particular user input type, which is associated with a video game function (e.g., pausing the video game) such that when a user triggers the user input type (e.g., presses a button) the video game is paused and currently available media assets are presented.

As referred to herein, an interactive media guidance application or, sometimes, a media guidance application or a guidance application is an application that allows users who desire a form of media guidance through an interface to efficiently navigate content selections, easily identify content that they may desire, or view media assets. For example, a media guidance application may allow users to access a particular media asset, including but not limited to a video game. In another example, a media guidance application may function as a video gaming application (i.e., a media guidance application that provides a user access to a video game).

The media guidance application and/or any instructions for performing any of the embodiments discussed herein may be encoded on computer readable media. Computer readable media include any media capable of storing data. The computer readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media applications, games, including, but not limited to, video games or other interactive content, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As used herein, a "video game" is an electronic game that involves human interaction with a user interface to generate visual, audio, or textual feedback to a user. For example, a video game may include a game played on specialized hardware (e.g., a game console), a game played on generic hardware (e.g., a software application, or game accessed on any other device.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, a media guidance application may determine a control scheme for operating a video game, in which the control scheme indicates a first user input type for performing a first function in the video game.

As used herein, "a control scheme" refers to a configuration that associates, assigns, and/or maps different user input types and/or automatic inputs to particular functions in order to provide a user with access to one or more media guidance application operations or video game functions. For example, the media guidance application may then determine a control scheme based on the different number of user input types, in which the control scheme maps a function to each user input type such that each of the available media guidance application operations in the list is accessible to the user through the use of one or more mapped functions. In another example, a control scheme may be determined by the video game and/or other media assets currently be accessed by a user. For example, a video game accessed by a user may dictate the particular functions that are performed by each user input type. For example, the control scheme may indicate different video game functions (e.g., the performance of an action within the video game) that are mapped to different user input types (e.g., the various buttons on a game controller).

As used herein, "a user input type" refers to an input that when triggered causes the performance of a distinctive action mapped to the input by a control scheme. In some embodiments, the media guidance application may associate user input types with any distinctive input (e.g., different buttons on a game controller, different keys on a keyboard, different vocal or non-vocal commands into a microphone, different movements of a motion sensitive device, etc.). For example, one user input type may be associated with the "volume up" button on a traditional remote control and another user input type may be associated with the "volume down" button on a traditional remote control.

As used herein, a "function" of a video game or a video game function refers to any action that may be performed in a video game. For example, a function may include one or more commands issued to a video game avatar or character whether concerning navigation about a virtual world, selecting virtual objects or performing virtual activities. Furthermore, functions may include an action performed by the video game whether or not related to a particular avatar or character such as accessing in-game menus, pausing the video game or otherwise controlling the progression of the video game, savings the progress of a video game, etc.

The media guidance application may cross-reference the first function with a database of functions that are suitable for linking to media guidance application operations to determine whether the first function is suitable for linking to at least one of the media guidance application operations.

For example, of the various functions (e.g., selecting in-game objects, performing in-game jumps, accessing in-game menus, pausing the video game, etc.), only some of the functions may be suitable for linking to media guidance application operations. For example, while a "pause" command may be suitable for linking to a media guidance application operations (e.g., generating an overlay presenting a program currently being broadcast while the video game is paused), a "jump" command (e.g., causing an in-game character to jump within the game) may not be suitable for linking to a media guidance application operation. Accordingly, the media guidance application may cross-reference a database to determine which functions are suitable for linking to media guidance application operations.

As referred to herein, a "media guidance application operation" refers to any operation corresponding to providing, receiving, and generating media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device for monitoring brain activity).

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Other operations of a media guidance application are to play media assets and provide fast access playback operations for those media assets. As referred to herein, the phrase "fast-access playback operations" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

Still other operations of media guidance application may include the control of devices used to consume media assets. For example, a media guidance application operation may include turning a device on and off, raising the volume associated with a device, adjusting the display settings of a device, assigning parental controls, transferring information from one device to another, storing and/or recording content, entering authorization information and/or payment information, etc.

In some embodiments, a media guidance application operation may relate to a social media activity such as publicly distributing a notification and/or media assets associated with a user or the video game of the user. For example, the media guidance application may retrieve a list of friends (e.g., a social network buddy list), contacts (e.g., retrieved from a phone/text message/e-mail account associated with the user), and/or other listings featuring other entities with known associations to the user and distribute the notification and/or media assets to contacts. For example, in response to a particular function of a video game being performed (e.g., an in-game character performed particular actions, a particular in-game score or level of progress was achieved, etc.), the media guidance application may post messages to the social network account associated with the user. The message may include a screenshot, recorded segment of a video game, or other media asset that evidences the feat of the user.

As used herein, a "social network" refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

In some embodiments, the media guidance application may determine whether or not a particular function was performed or whether or not a particular media guidance application operation should be performed based on a characteristic of the video game. As referred to herein, a "characteristic" is any attribute of a media asset and/or video game that may be classified, identified, and/or used to distinguish one media asset and/or video game from another. For example, based on the source, content, context, file type, metadata, size, or another characteristic of the media asset and/or video game, the media guidance application may determine what, if any, other users the media asset and/or video should be shared with.

In some embodiments, the characteristics associated with a media asset and/or video game may be determined prior to, concurrently with, or after receiving a particular media asset (e.g., a recorded segment or screenshot of a video game), after receiving a particular series of one or more user input types, or after detecting that a particular function has been performed. For example, the media guidance application may receive data describing the characteristics of all available media assets, functions being performed, or user inputs being received. In another example, the media guidance application may receive data associated with the media asset and/or video game that indicates the characteristics of the media asset and/or video game. In yet another example, the media guidance application may determine the characteristics of a media asset by processing the media asset and/or video game or by processing data associated with the media asset and/or video game.

For example, the media guidance application may determine the characteristics associated with the media asset by applying one or more content recognition techniques to the media asset and/or video game. For example, the media guidance application may use a content recognition module or algorithm to generate data describing the context, content, and/or any other data necessary for determining a characteristic of a media asset and/or video game. For example, the content recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine objects in the media asset. For example, the media guidance application may receive data in the form of a video. The video may include a series of frames. For each frame of the video, the media guidance application may use a content recognition module or algorithm to determine the objects (e.g., people, places, things, etc.) in each of the frames or series of frames, which may be used to determine a characteristic of the media asset. For example, based on the detection of a multitude of explosions in the frames, the media guidance application may determine the circumstances where the media asset and/or video game includes an in-game explosion.

In some embodiments, the content recognition module or algorithm may also include speech recognition techniques, including, but not limited to, Hidden Markov Models, dynamic time warping, and/or neural networks (as described above) to translate spoken words into text and/or processing audio data. The spoken words may come from the media asset and/or video game. Additionally or alternatively, the spoken words may come from users interactive with the media asset and/or video game. For example, in response to detecting that a user is happy with their progress in the video game, the media guidance application may post a media asset (e.g., featuring a clip of the video game or the performance of the user in the video game) to a social media site.

In addition, the media guidance application may use multiple types of optical character recognition and/or fuzzy logic, for example, when processing keyword(s) retrieved from data (e.g., textual data, translated audio data, user inputs, etc.) describing the media asset (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine a characteristic of a media asset. For example, the media guidance application may process on-screen scores or values to determine if the user has achieved a particular number of points or other levels of achievement in the video game.

For example, a characteristic may include a keyword detected in the video game (e.g., indicating that a particular score has been achieved, a secret unlocked, or a password generated, etc.). For example, the media guidance application may identify a keyword associated with the media asset and compare the keyword to a user preference for keywords.

In some embodiments, the media guidance application may alert a user to available media guidance application operations by a textual (e.g., a textual list of media guidance application operations that may be performed), graphical (e.g., an on-screen remote control that intuitively signals to the user available media guidance application operations), or audio presentation (e.g., an announcement encouraging the user to perform a particular action or to to perform a particular media guidance application operation). As used herein, "an alert" refers to any content that notifies a user regarding the presence of, or how to perform, any media guidance application operation.

The media guidance application may select a media guidance application operation to associate with the first user input type in response to determining that the first function is suitable for linking to at least one of the media guidance application operations and/or that the first function is suitable for linking to a particular media guidance application operation (e.g., as discussed below in relation to FIG. 7). For example, in response to determining that a function of the video game (e.g., performing a pause command) is suitable for linking to at least one of the media guidance application operations (or is suitable for linking to a particular media guidance application operation (e.g., of all available media guidance application operations), the media guidance application may select a media guidance application operation (e.g., the presentation of calendar reminders) to be linked to the user input type that is associated with the suitable function. For example, the media guidance application may cross-reference the first function with a database listing media guidance application operations that correspond to different functions to determine the media guidance application operation or operations to associate with the first user input type.

It should be noted that a video game function is suitable for linking to a media guidance application operation if the performance of the media guidance application is not detrimental to the performance of the video game function. In some cases, a video game function is suitable for linking to a media guidance application operation if the performance of the media guidance application complements the performance of the video game function. For example, the media guidance application may select a media guidance application operation to perform in response to determining that a user would more likely than not prefer the media guidance application to be triggered automatically (i.e., without a request for the media guidance application operation being received independently of the request of the video game function).

In some embodiments, a video game function is suitable for linking to a media guidance application operation if the performance of the media guidance application is indicated as desirable, allowable, or other relationship by a user selection or user profile. For example, a user may customize the user input type, video game function, etc. that corresponds to one or more media guidance application operations. Alternatively or additionally, the media guidance application may receive instructions (e.g., from a content provider) that indicates particular media guidance application operations that should be performed with particular video game functions.

In some embodiments, the media guidance application operations may be dynamically linked with particular functions based on prior use by the user. For example, the media guidance application may monitor what media guidance application operations are used by the user (or by other users) during a media guidance application. For example, the media guidance application may receive data that indicates that users typically enjoy particular activities at particular times during a video game. In response, the media guidance application may link media guidance application operations that are related to the particular activities to the function.

In some embodiments, the media guidance application may determine that a video game function is suitable for linking to a media guidance application operation by cross-referencing the function with a database of functions suitable for linking to media guidance application operations. For example, the media guidance application may input a function (e.g., associated with a first user input) into the database. The media guidance application may then retrieve data associated with the function that indicates whether or not the function is suitable for a media guidance application. In addition, the database may indicate one or more media guidance application operations that are suitable for the function. For example, upon inputting the function into the database, the media guidance application may filter all available media guidance application operations based on whether or not the available media guidance application operations are suitable for the function. The database may then output the available media guidance application operations that are suitable.

The media guidance application may perform the first function and the selected media guidance application operation in response to receiving the first user input type. For example, in response to a user activating the user input type, the media guidance application may pause the video game (e.g., the suitable function) and perform the selected media guidance application operation (e.g., recommend available media assets) automatically (i.e., without a user input requesting the media guidance application operation that is independent of the user input request for the performance of the video game function).

In some embodiments, the media guidance application may determine that the control scheme includes multiple user input types. For example, the control scheme may include a first user input type that is associated with a first function in the video game (e.g., activating an in-game menu) and a second user input type that is associated with a second function (e.g., selecting in-game objects) in the video game. Moreover, the media guidance application may not select a media guidance application operation to associate with the second user input type in response to determining that the second function is not suitable for linking to at least one of the media guidance application operations. Accordingly, the media guidance application may perform only the second function in response to receiving the second user input type.

In some embodiments, a function associated with a user input type may change based on the point in the video game. As used herein, a "point" of a video game refers to a level of in-game progress, positioning, or association. For example, a point may refer to the progress of the user (e.g., a level of the video game that the user has obtained), the current positioning (e.g., relative to in-game benchmarks or virtual locations within the virtual world of the video game), or other associations (e.g., the number of items that a user has collected, the number of point a user has accumulated, etc.).

For example, a first user input type may be associated with a first function (e.g., causing an in-game player to move in a particular direction) at a first point in the video game (e.g., during a level of the video game) and a second function (e.g., navigating an in-game menu) at a second point (e.g., prior to beginning a level) in the video game. In such cases, the media guidance application may determine whether the current point in the video game corresponds to the first point or the second point.

In some embodiments, a function associated with a user input type may change based on one or more user input types that were received before. For example, a first user input type may initially be associated with a first function (e.g., causing an in-game player to move in a particular direction). However, the first user input type may be associated with a second function (e.g., navigating an in-game menu), if the user previously selected a second user input type (e.g., causing an in-game menu to be activated) before the first user input type. In such cases, the media guidance application may determine whether the second user input type was received before the first user input type.

In some embodiments, the media guidance application may track the user input types that are received, and the order in which they are received in a log. The media guidance application may then cross-reference the log to determine what user input type(s) was received and/or the affect of prior user input types on the function of the current user input type.

In some embodiments, a media guidance application operation associated with a user input type may change based on whether or not a media guidance application operation has been performed. For example, a first user input type may initially cause a presentation of media listings to be generated for display. However, the first user input type may also be associated with removing the presentation of media listings, if the first user input is received while the presentation of media listings is generated for display. In such cases, the media guidance application may determine whether the second user input type was received before the first user input type.

In some embodiments, a media guidance application operation associated with a user input type may change based on the point in the video game. For example, a user input type may be associated with a first media guidance application operation (e.g., recording a screenshot or a series of screenshots of the video game gameplay) at a first point in the video game (e.g., during a level of the video game) and a second media guidance application operation (e.g., raise the volume on a display device) at a second point (e.g., prior to beginning a level) in the video game. In such cases, the media guidance application may determine whether the current point in the video game corresponds to the first point or the second point.

In some embodiments, a media guidance application operation associated with a user input type may change based on the current content of the video game. As referred to herein, the "content of a video game" may refer to a particular object displayed within a video game, may refer to images, words, or sounds communicated to a user by the video game, and/or may refer to any other circumstance, attribute, or characteristic associated with the video game. For example, a user input type associated with first content (e.g., selecting an in-game object associated with a first entity) may be associated with a first media guidance application operation (e.g., presenting an advertisement for the first entity), and the same user input type, but now associated with second content (e.g., selecting an in-game object associated with a second entity) may be associated with a second media guidance application operation (e.g., presenting an advertisement for the first entity).

In some embodiments, the media guidance application may also link in-game objects to out-of-game content sources. For example, the media guidance application may insert out-of-game content for example advertisements or media listings into areas of a video game or replace objects in the video game (e.g., background decorations) with out-of-game content. Furthermore, the media guidance application may allow the in-game video game character or avatar to be controlled to access or to interact with out-of-game content. For example, the media guidance application may allow a video game character to select a media asset (e.g., out-of-game content) for purchase, display, etc. The video game character may also be used an animation to perform any media guidance application operation. For example, the media guidance application may user the video game character or other in-game content to create an animation accompanying one or more media guidance application operations.

In some embodiments, a control scheme associated with the video game or with a media guidance application may change based on whether or not a media guidance application operation has been performed. For example, a first user input type may initially cause a media guidance application operation (e.g., recording a segment of the video game) to be performed. However, after the media guidance application has been performed, the control scheme may be modified (e.g., to include fast-access playback operations for the recorded segment).

In some embodiments, the media guidance application may track the media guidance application operations that are received, and the order in which they are received in a log (e.g., as described above in relation to the user input types). The media guidance application may then cross-reference the log to determine what media guidance application operation(s) was received and/or the affect of prior media guidance application operations on the function of a current media guidance application operation.

Figure 2:
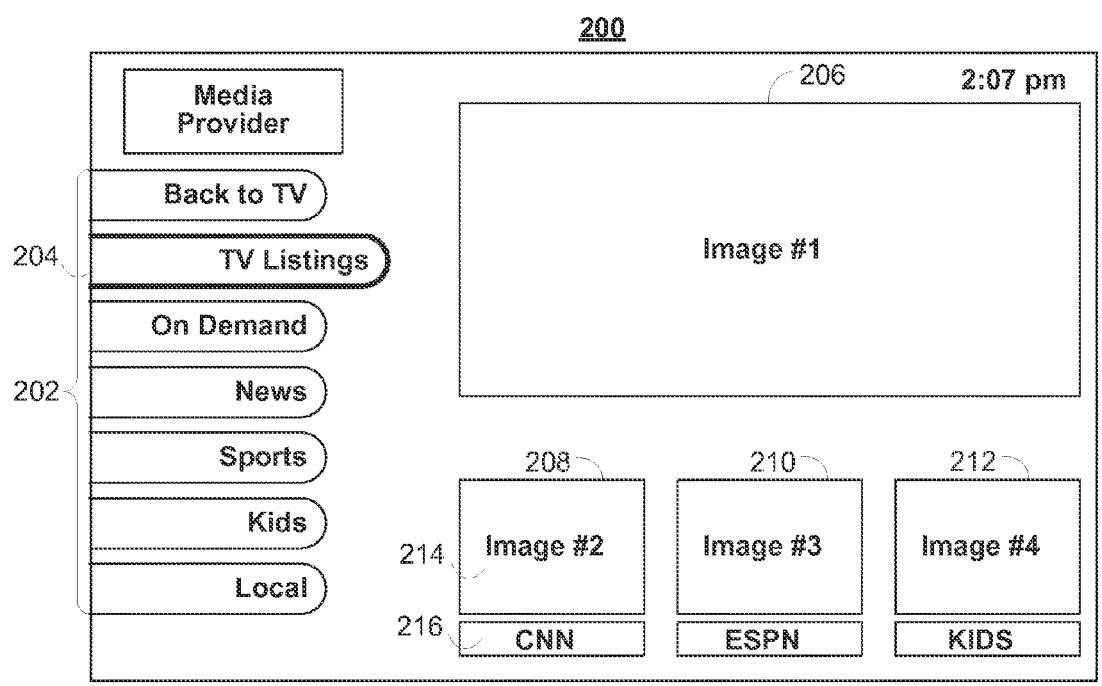
FIG. 2 shows another illustrative media guidance application in accordance with some embodiments of the disclosure.
Figure 5A:
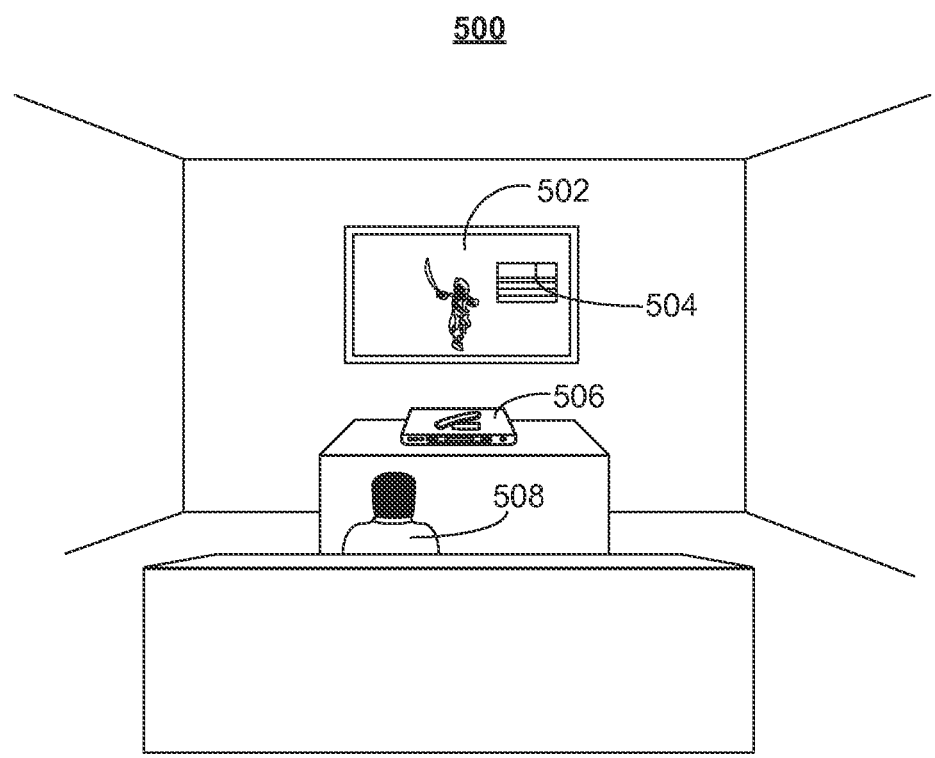
FIG. 5A shows a representation of a user activating a media guidance application operation during a video game in accordance with some embodiments of the disclosure.

FIGS. 1-2 show illustrative display screens that may be used to provide media guidance application operations. The display screens shown in FIGS. 1-2 may be implemented on any suitable user equipment device or platform. While the displays of FIGS. 1-2 are illustrated as full screen displays, they may also be fully or partially overlaid over content being displayed (e.g., as shown in FIG. 5A). A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
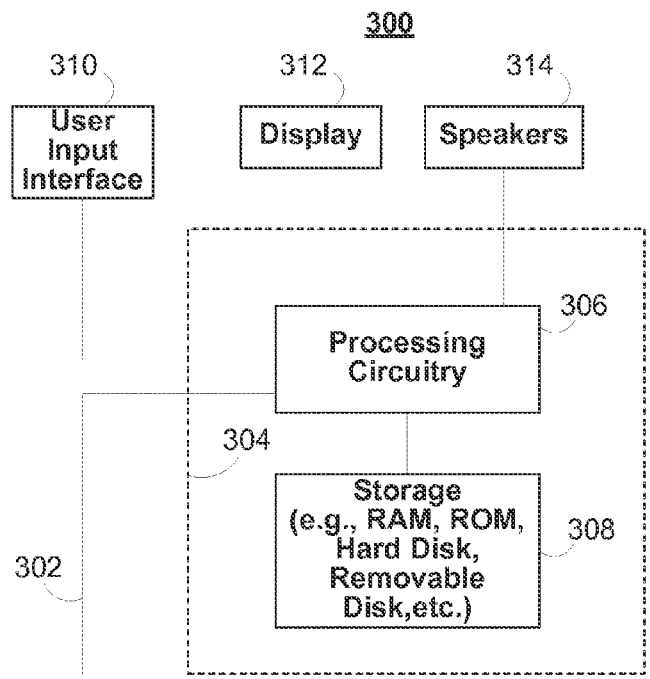
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays.

For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
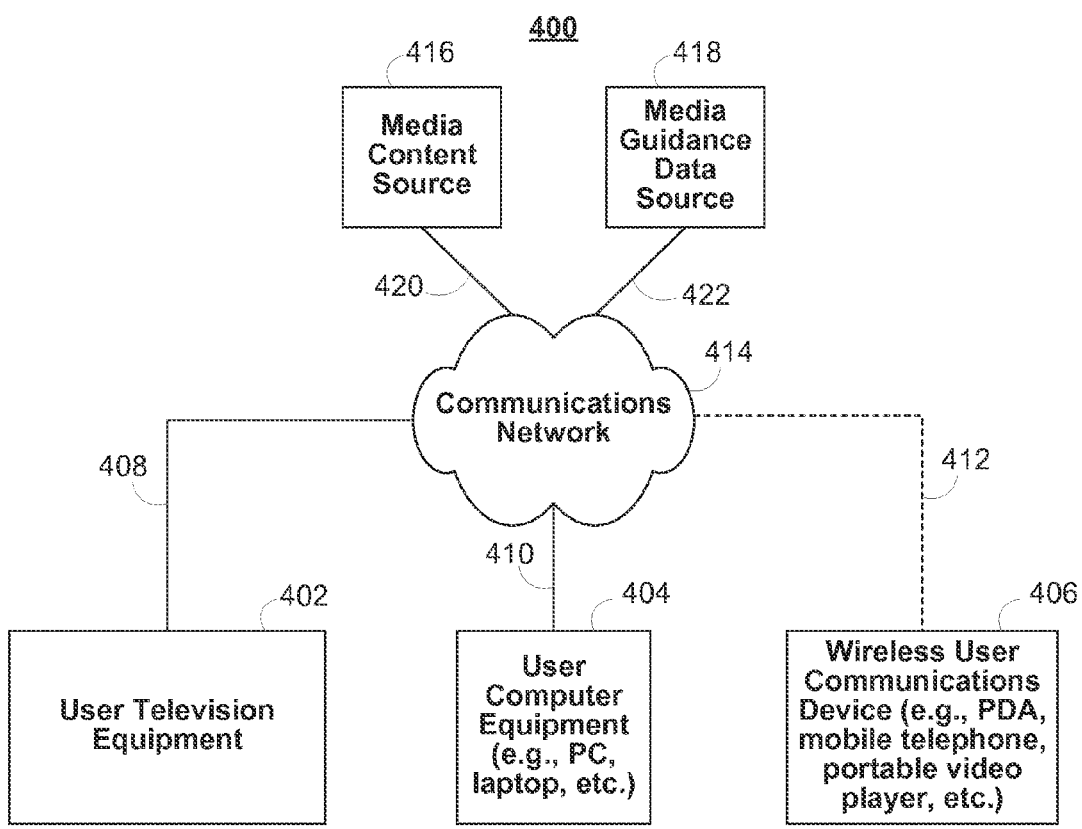
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired).

Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5A shows a representation of a user activating a media guidance application operation during a video game. For example, FIG. 5A shows viewing area 500. Viewing area 500 includes user device 506 (which may correspond to user equipment device 402, 404, and/or 406 (FIG. 4)). User device 506 is currently presenting video game 502 being played by user 508.

For example, in response to one or more commands input by user 508, video game 502 responds by performing one or more in-game functions. For example, video game 502 may correspond to a control scheme that indicates the particular user commands that correspond to particular in-game functions. In some embodiments, a media guidance application may determine (e.g., as described in depth in relation to FIG. 6) the control scheme for video game 502 and map the performance of a particular media guidance application operation (e.g., the presentation of media guidance data 504), unrelated to video game 502, to the particular user input type already mapped to a video game function such that when user 508 performs the video game function, the particular media guidance application operation (e.g., presentation of media guidance data 504) is also performed.

Figure 5B:
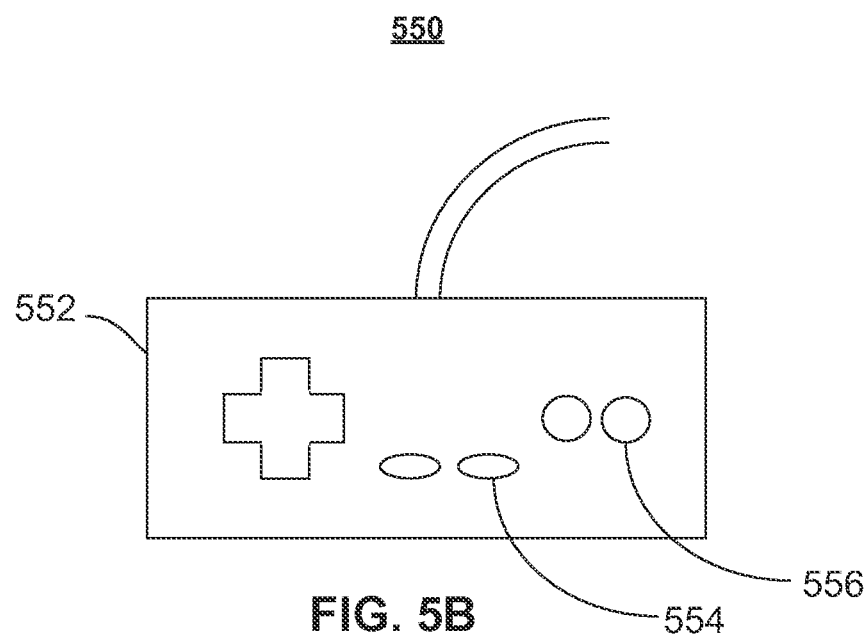
FIG. 5B shows a representation of a video game controller in which the activation of a media guidance application operation is mapped to a particular user input type in accordance with some embodiments of the disclosure.

For example, FIG. 5B shows a representation of a user input device 552 (e.g., a video game controller used to control video game 502 (FIG. 5A)) in which the activation of a media guidance application operation (e.g., the presentation of media guidance application 504 (FIG. 5A)) is mapped to a particular user input type (e.g., button 552).

For example, of the various functions (e.g., selecting in-game objects, performing in-game jumps, accessing in-game menus, pausing the video game, etc.) only some of the functions may be suitable for linking to media guidance application operations. For example, while a "pause" command (e.g., associated with button 554) may be suitable for linking to a media guidance application operation (e.g., generating an overlay presenting media guidance data 504 (FIG. 5A) while video game 502 (FIG. 5A) is paused), a "jump" command that causes an in-game character to jump within the game (e.g., associated with button 556) may not be suitable for linking to a media guidance application operation. The media guidance application may then determine to link a media guidance application operation with the pause function (e.g., with button 554), but not link a media guidance application operation with the "jump" command (e.g., with button 556). Therefore, the media guidance application may map the performance of the media guidance application operation to the receipt of the particular user input type (e.g., button 504 (FIG. 5A)) such that when a user triggers the user input type (e.g., presses button 504 (FIG. 5A)), video game 502 (FIG. 5A) is paused and media guidance data 504 (FIG. 5A) is presented.

Figure 6:
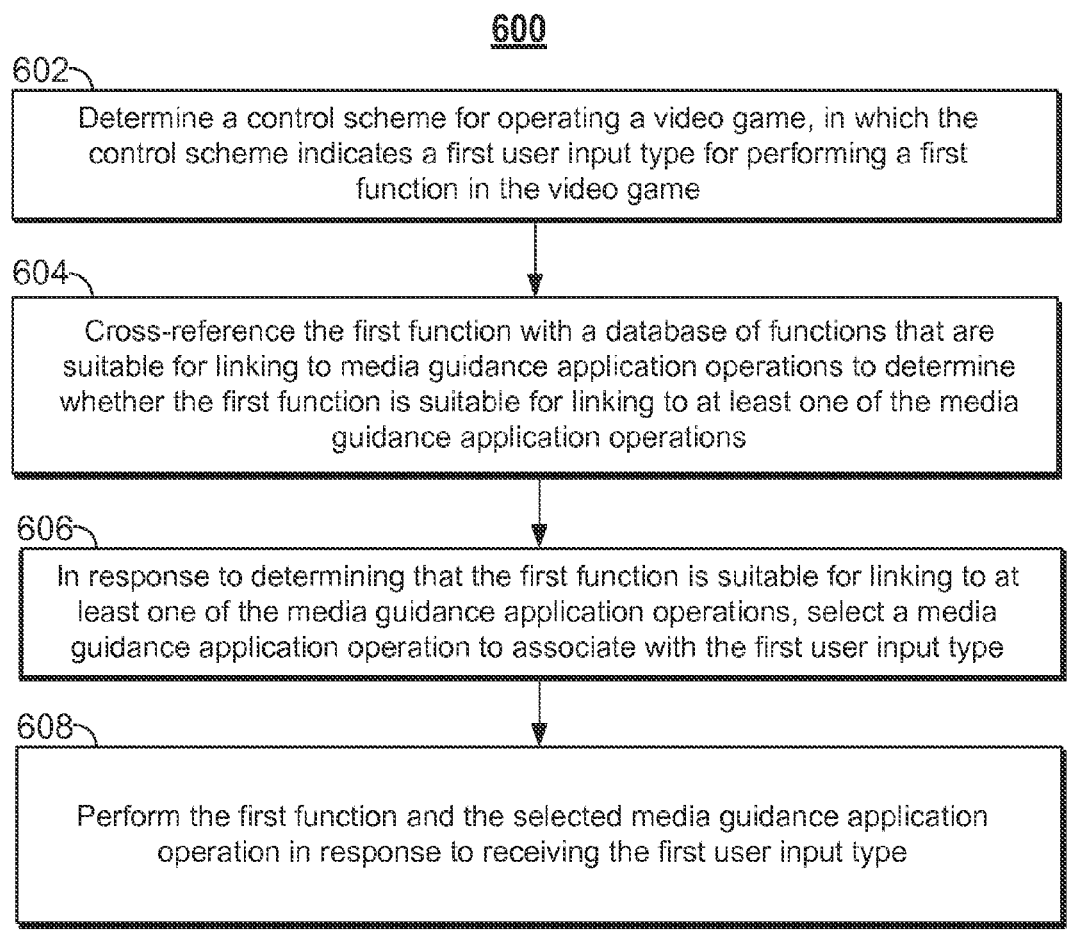
FIG. 6 is a flow-chart of illustrative steps involved in performing the first function and the selected media guidance application operation in response to receiving the first user input type in accordance with some embodiments of the disclosure.

FIG. 6 is a flow-chart of illustrative steps involved in performing the first function and the selected media guidance application operation in response to receiving the first user input type. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to determine a control scheme for a video game and map the performance of particular media guidance application operations, unrelated to the video game, to the particular user input type already mapped to a video game function such that when the user performs the video game function, the particular media guidance application operation is also performed. In addition, one or more steps of process 600 may be incorporated into or combined with one or more steps of any other process or embodiment (e.g., process 700 (FIG. 7)).

At step 602, the media guidance application determines (e.g., via control circuitry 304 (FIG. 3)) a control scheme for operating a video game, in which the control scheme indicates a first user input type (e.g., on user input interface 310 (FIG. 3)) for performing a first function in the video game. For example, the control scheme (e.g., stored locally at storage 308 (FIG. 3) or remotely at any location accessible via communications network 414 (FIG. 4)) may indicate different video game functions (e.g., the performance of an action within the video game) that are mapped to different user input types (e.g., the button 552 on user input device 554 (FIG. 5B)).

At step 604, the media guidance application cross-references (e.g., via control circuitry 304 (FIG. 3)) the first function with a database of functions (e.g., stored locally at storage 308 (FIG. 3) or remotely at any location accessible via communications network 414 (FIG. 4)) that are suitable for linking to media guidance application operations to determine whether the first function is suitable for linking to at least one of the media guidance application operations. For example, of the various functions (e.g., selecting in-game objects, performing in-game jumps, accessing in-game menus, pausing the video game, etc.) only some of the functions may be suitable for linking to media guidance application operations. For example, while a "pause" command may be suitable for linking to a media guidance application operations (e.g., generating an overlay presenting a program currently being broadcast while the video game is paused), a "jump" command (e.g., causing an in-game character to jump within the game) may not be suitable for linking to a media guidance application operation. Accordingly, the media guidance application may cross-reference the database to determine (e.g., via control circuitry 304 (FIG. 3)) which functions are suitable for linking to media guidance application operations.

For example, the media guidance application may input (e.g., via control circuitry 304 (FIG. 3)) a function (e.g., associated with a first user input) into the database (e.g., stored locally at storage 308 (FIG. 3) or remotely at any location accessible via communications network 414 (FIG. 4)). The media guidance application may then retrieve data (e.g., at control circuitry 304 (FIG. 3)) associated with the function that indicates whether or not the function is suitable for a media guidance application. For example, information in a field of the database may indicate (e.g., to control circuitry 304 (FIG. 3)) whether or not the inputted function is suitable for linking to one or more media guidance application operations. Thus, the media guidance application may interpret (e.g., via control circuitry 304 (FIG. 3)) the information in the field and determine (e.g., via control circuitry 304 (FIG. 3)) whether or not the function is suitable for a media guidance application operation.

At step 606, the media guidance application selects (e.g., via control circuitry 304 (FIG. 3)) a media guidance application operation to associate with the first user input type in response to determining (e.g., via control circuitry 304 (FIG. 3)) that the first function is suitable for linking to at least one of the media guidance application operations. For example, in response to determining (e.g., via control circuitry 304 (FIG. 3)) that a function of the video game (e.g., performing a pause command) is suitable for linking to at least one of the media guidance application operations, the media guidance application may select (e.g., via control circuitry 304 (FIG. 3)) a media guidance application operation (e.g., the presentation of media guidance data 504 (FIG. 5A)) to be linked to the user input type that is associated with the suitable function. For example, the media guidance application may cross-reference (e.g., via control circuitry 304 (FIG. 3)) the first function with a database (e.g., stored locally at storage 308 (FIG. 3) or stored remotely at any location accessible via communications network 414 (FIG. 4)) listing media guidance application operations that correspond to different functions to determine the media guidance application operation to associate with the first user input type.

For example, in addition to determining (e.g., via control circuitry 304 (FIG. 3)) whether or not a function is suitable for one or more media guidance application operations, the database may indicate the one or more media guidance application operations that are suitable for the function. For example, upon inputting (e.g., via control circuitry 304 (FIG. 3)) the function into the database, the media guidance application may filter (e.g., via control circuitry 304 (FIG. 3)) all available media guidance application operations based on whether or not the available media guidance application operations are suitable for the function. The database may then output (e.g., to control circuitry 304 (FIG. 3)) the available media guidance application operations that are suitable.

At step 608, the media guidance application performs (e.g., via control circuitry 304 (FIG. 3)) the first function and the selected media guidance application operation in response to receiving the first user input type (e.g., user input interface 310 (FIG. 3)). For example, in response to a user activating the user input type (e.g., pressing button 554 (FIG. 5B)), the media guidance application may pause the video game (e.g., the suitable function) and perform the selected media guidance application operation (e.g., present media guidance data 504 (FIG. 5A)) automatically (i.e., without a user input requesting the media guidance application operation that is independent of the user input request the performance of the video game function).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
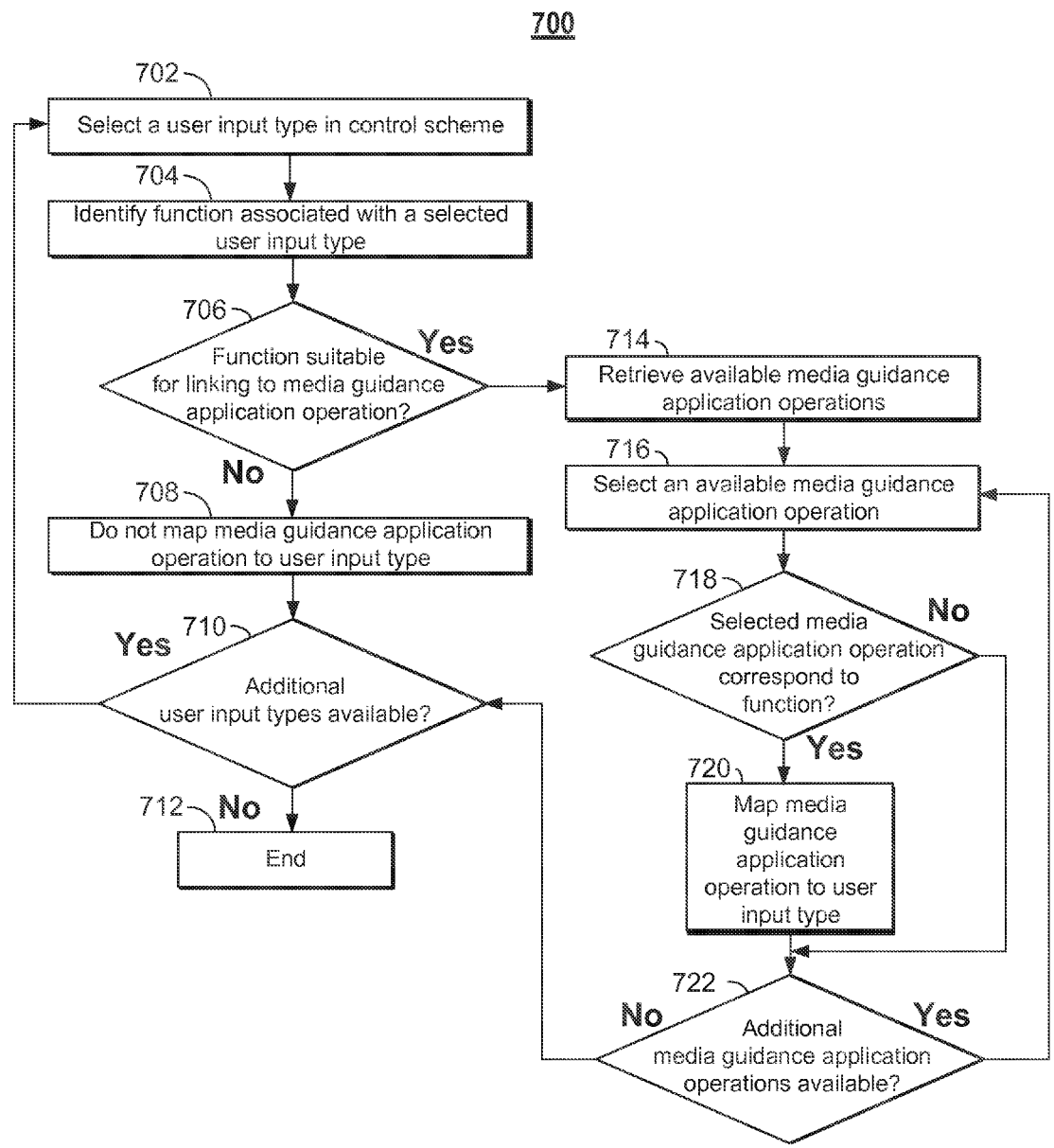
FIG. 7 is a flow-chart of illustrative steps involved in mapping media guidance application operations to user input types in accordance with some embodiments of the disclosure.

FIG. 7 is a flow-chart of illustrative steps involved in mapping media guidance application operations to user input types. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to determine a control scheme for a video game and map the performance of particular media guidance application operations, unrelated to the video game, to the particular user input type already mapped to a video game function such that when the user performs the video game function, the particular media guidance application operation is also performed. In addition, one or more steps of process 700 may be incorporated into or combined with one or more steps of any other process or embodiment (e.g., process 600 (FIG. 6)).

At step 702, the media guidance application (e.g., via control circuitry 304 (FIG. 3)) selects a user input type in a control scheme. For example, after determining (e.g., via control circuitry 304 (FIG. 3)) a control scheme associated with a video game (e.g., video game 502 (FIG. 5A)), the media guidance application determines a control scheme (e.g., stored locally at storage 308 (FIG. 3) or remotely at any location accessible via communications network 414 (FIG. 4)) associated with the video game. The media guidance application may then iterate through each user input type in the control scheme to determine whether or not the user input type should be associated with a media guidance application operations and if so, the media guidance application operation that it should be associated with.

At step 704, the media guidance application identifies (e.g., via control circuitry 304 (FIG. 3)) a function associated with a selected user input type. For example, the media guidance application may reference the control scheme as well as a point in the video game, prior user inputs, etc., to determine the particular function that will be performed in response to a user triggering the selected user input type.

At step 706, the media guidance application determines (e.g., via control circuitry 304 (FIG. 3)) whether or not the function is suitable for linking to a media guidance application operation. In some embodiments, step 706 may correspond to step 604 (FIG. 6)). For example, as discussed above, the media guidance application may cross-reference (e.g., via control circuitry 304 (FIG. 3)) a function with a database of functions (e.g., stored locally at storage 308 (FIG. 3) or remotely at any location accessible via communications network 414 (FIG. 4)) that are suitable for linking to media guidance application operations to determine whether the first function is suitable for linking to at least one of the media guidance application operations.

For example, the media guidance application may input (e.g., via control circuitry 304 (FIG. 3)) a function (e.g., associated with a first user input) into the database (e.g., stored locally at storage 308 (FIG. 3) or remotely at any location accessible via communications network 414 (FIG. 4)). The media guidance application may then retrieve data (e.g., at control circuitry 304 (FIG. 3)) associated with the function that indicates whether or not the function is suitable for a media guidance application. For example, of the various functions (e.g., selecting in-game objects, performing in-game jumps, accessing in-game menus, pausing the video game, etc.), only some of the functions may be suitable for linking to media guidance application operations. For example, while a "pause" command (e.g., associated with button 502 (FIG. 5B)) may be suitable for linking to a media guidance application operation (e.g., presenting media guidance data 504 (FIG. 5A) while video game 502 (FIG. 5A) is paused), a "jump" command (e.g., associated with button 556 (FIG. 5B)) that causes an in-game character to jump within the game may not be suitable for linking to a media guidance application operation.

If the media guidance application determines (e.g., via control circuitry 304 (FIG. 3)) that the function is suitable for linking to the media guidance application operation, the media guidance application proceeds to step 714. If the media guidance application determines (e.g., via control circuitry 304 (FIG. 3)) that the function is not suitable for linking to the media guidance application operation, the media guidance application proceeds to step 708.

At step 708, the media guidance application determines (e.g., via control circuitry 304 (FIG. 3)) whether or not there are additional user input types available. For example, the control scheme may indicate or the user input interface may have available additional user input types (e.g., button 556 (FIG. 5B)). If the media guidance application determines (e.g., via control circuitry 304 (FIG. 3)) that there are additional user input types available, the media guidance application returns to step 702 and selects one of the additional user input types. If the media guidance application determines (e.g., via control circuitry 304 (FIG. 3)) that there are no additional user input types available, the media guidance application proceeds to step 712 and the mapping process ends.

Returning to step 706, if the media guidance application determines (e.g., via control circuitry 304 (FIG. 3)) that the function is suitable for linking to the media guidance application operation, the media guidance application proceeds to step 714. At step 714, the media guidance application retrieves (e.g., via control circuitry 304 (FIG. 3)) available media guidance application operations. For example, the media guidance application may cross-reference (e.g., via control circuitry 304 (FIG. 3)) a database (e.g., stored locally at storage 308 (FIG. 3) or remotely at any location accessible via communications network 414 (FIG. 4)) to determine what media guidance application operations if any are currently available, or will be available, for performance. The media guidance application may then retrieve (e.g., via control circuitry 304 (FIG. 3)) the list of the media guidance application operations for determining if any of the listed media guidance application operations should be linked to the selected function. Then at step 716, the media guidance application selects (e.g., via control circuitry 304 (FIG. 3)) an available media guidance application operation and proceeds to step 718.

At step 718, the media guidance application determines (e.g., via control circuitry 304 (FIG. 3)) whether the selected media guidance application operation corresponds to the function. For example, in some embodiments, the media guidance application may determine (e.g., via control circuitry 304 (FIG. 3)) that a video game function is suitable for linking to a media guidance application operation by cross-referencing the function with a database of functions suitable for linking to media guidance application operations. For example, the media guidance application may input a function (e.g., associated with a first user input) into the database. The media guidance application may then retrieve (e.g., via control circuitry 304 (FIG. 3)) data associated with the function that indicates whether or not the function is suitable for a media guidance application. In addition, the data in the database may indicate one or more media guidance application operations that are suitable for the function. For example, upon inputting the function into the database, the media guidance application may filter (e.g., via control circuitry 304 (FIG. 3)) all available media guidance application operations based on whether or not the available media guidance application operations are suitable for the function. The database may then output the available media guidance application operations that are suitable.

For example, while a "pause" function may be suitable for presenting currently available media asset recommendations (e.g., as a user will not currently be interacting with the video game), a "jump" function may not be suitable for presenting currently available media asset recommendations (e.g., as a user will be currently be interacting with the video game). In contrast, while a "pause" function may not be suitable for linking to a media guidance application operation associated with beginning to record a segment of the video gameplay (e.g., as a user will not currently be interacting with the video game), a "jump" function may be suitable for function may not be suitable for linking to a media guidance application operation associated with beginning to record a segment of the video gameplay (e.g., as a user will be currently be interacting with the video game).

If the media guidance application determines (e.g., via control circuitry 304 (FIG. 3)) at step 718 that the selected media guidance application operation corresponds to the function, the media guidance application maps (e.g., via control circuitry 304 (FIG. 3)) the media guidance application operation to the user input type associated with the function at step 720 and proceeds to step 722. The media guidance application may store the map in memory (e.g., local storage 308 (FIG. 3) or remote storage available at any location accessible via communications network 414 (FIG. 4)). If the media guidance application determines (e.g., via control circuitry 304 (FIG. 3)) at step 718 that the selected media guidance application operation does not correspond to the function, the media guidance application does not map (e.g., via control circuitry 304 (FIG. 3)) the media guidance application operation to the user input type associated with the function and proceeds to step 722.

At step 722, the media guidance application determines (e.g., via control circuitry 304 (FIG. 3)) whether or not there are additional media guidance application operations available. For example, in some embodiments, the media guidance application may map one or more media guidance application operations to the same user input. Accordingly, a user input (e.g., received via user input interface 310 (FIG. 3)) triggering the user input type may cause multiple media guidance application operations to be performed by the media guidance application. If the media guidance application determines (e.g., via control circuitry 304 (FIG. 3)) that the function is suitable for linking to the media guidance application operation, the media guidance application proceeds to step 714. If the media guidance application determines (e.g., via control circuitry 304 (FIG. 3)) that there are additional media guidance application operations available, the media guidance application returns to step 716. If the media guidance application determines (e.g., via control circuitry 304 (FIG. 3)) that there are no additional media guidance application operations available, the media guidance application proceeds to step 710.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in realtime. It should also be noted, the systems and/or methods described above may be applied to, or used in accordance with, other systems and/or methods.

What is claimed is:

1. A method for controlling media guidance application operations during a video gaming application, the method comprising:
   determining a control scheme for operating a video game, wherein the control scheme indicates a first user input type for performing a first function of a plurality of functions in the video game;
   inputting the first function into a database, wherein the database lists the plurality of functions;
   retrieving a first indication from the database, wherein the first indication is associated with the first function;
   determining whether the first function is suitable for linking to at least one of a plurality of media guidance application operations based on the first indication;
   in response to determining that the first function is suitable for linking to at least one of the plurality of media guidance application operations, retrieving a second indication from the database that indicates that a first media guidance application operation of the plurality of media guidance application operations is suitable for linking to the first function;
   selecting the first media guidance application operation of the plurality of media guidance application operations to associate with the first user input type based on the second indication;
   generating for display an on-screen remote control that indicates that the selected first media guidance application operation is associated with the first user input type; and
   performing the first function and the selected media guidance application operation in response to receiving the first user input type.

2. The method of claim 1, wherein the control scheme indicates a second user input type for performing a second function of the plurality of functions in the video game, and further comprising:
   in response to determining that the second function is not suitable for linking to at least one of the plurality of media guidance application operations, not selecting the first media guidance application operation of the plurality of media guidance application operations to associate with the second user input type; and
   performing only the second function in response to receiving the second user input type.

3. The method of claim 1, wherein the first user input type is associated with the first function at a first point in the video game and a second function at a second point in the video game, and further comprising:
   determining whether a current point in the video game corresponds to the first point or the second point.

4. The method of claim 1, wherein the first user input type is associated with the first function only after receiving a second user input type, and further comprising:
   determining whether the second user input type was received before the first user input type.

5. The method of claim 1, wherein the first function is associated with pausing the video game, and wherein the first media guidance application operation of the plurality of media guidance application operations is associated with presenting media listings for currently available media assets.

6. The method of claim 1, further comprising canceling the first function and the selected media guidance application operation after receiving the first user input type a second time.

7. The method of claim 1, wherein the first function is associated with beginning a segment of the video game, and wherein the first media guidance application operation of the plurality of media guidance application operations is associated with recording gameplay of the segment of the video game.

8. The method of claim 1, wherein the first function is associated with selecting an in-game object, and wherein the first media guidance application operation of the plurality of media guidance application operations is associated with recommending a media asset associated with the in-game object.

9. The method of claim 1, further comprising applying a different control scheme after performing the first function and the selected media guidance application operation.

10. A system for controlling media guidance application operations during a video gaming application, the system comprising:
   storage circuitry configured to store a database of functions that are suitable for linking to media guidance application operations; and
   control circuitry configured to:
   determine a control scheme for operating a video game, wherein the control scheme indicates a first user input type for performing a first function of a plurality of functions in the video game;
   input the first function into the database;
   retrieve a first indication from the database, wherein the first indication is associated with the first function;
   determine whether the first function is suitable for linking to at least one of a plurality of media guidance application operations based on the first indication;
   in response to determining that the first function is suitable for linking to at least one of the plurality of media guidance application operations, retrieve a second indication from the database that indicates that a first media guidance application operation of the plurality of media guidance application operations is suitable for linking to the first function;
   select the first media guidance application operation of the plurality of media guidance application operations to associate with the first user input type based on the second indication;
   generate for display an on-screen remote control that indicates that the selected first media guidance application operation is associated with the first user input type; and
   perform the first function and the selected media guidance application operation in response to receiving the first user input type.

11. The system of claim 10, wherein the control scheme indicates a second user input type for performing a second function of the plurality of functions in the video game, and wherein the control circuitry is further configured to:
   in response to determining that the second function is not suitable for linking to at least one of the plurality of media guidance application operations, not select the first media guidance application operation of the plurality of media guidance application operations to associate with the second user input type; and
   perform only the second function in response to receiving the second user input type.

12. The system of claim 10, wherein the first user input type is associated with the first function at a first point in the video game and a second function at a second point in the video game, and wherein the control circuitry is further configured to:
   determine whether a current point in the video game corresponds to the first point or the second point.

13. The system of claim 10, wherein the first user input type is associated with the first function only after receiving a second user input type, and wherein the control circuitry is further configured to:
   determine whether the second user input type was received before the first user input type.

14. The system of claim 10, wherein the first function is associated with pausing the video game, and wherein the first media guidance application operation of the plurality of media guidance application operations is associated with presenting media listings for currently available media assets.

15. The system of claim 10, further comprising control circuitry configured to cancel the first function and the selected media guidance application operation after receiving the first user input type a second time.

16. The system of claim 10, wherein the first function is associated with beginning a segment of the video game, and wherein the first media guidance application operation of the plurality of media guidance application operations is associated with recording gameplay of the segment of the video game.

17. The system of claim 10, wherein the first function is associated with selecting an in-game object, and wherein the first media guidance application operation of the plurality of media guidance application operations is associated with recommending a media asset associated with the in-game object.

18. The system of claim 10, wherein the control circuitry is further configured to apply a different control scheme after performing the first function and the selected media guidance application operation.

* * * * *